United States Patent [19]

Takenaka et al.

[11] Patent Number: 4,899,809

[45] Date of Patent: Feb. 13, 1990

[54] AUTOMOTIVE AIR CONDITIONER SYSTEM WITH AUTOMATIC ADJUSTMENT OF DISCHARGE AIR TEMPERATURE

[75] Inventors: Yasushi Takenaka; Shunsuke Kajita, both of Kanagawa, Japan

[73] Assignee: Nissan Shatai Company, Limited, Kanagawa, Japan

[21] Appl. No.: 100,259

[22] Filed: Sep. 23, 1987

[30] Foreign Application Priority Data

Mar. 31, 1987 [JP] Japan ............................. 62-48171[U]

[51] Int. Cl.⁴ ...................... G05D 23/00; F25B 29/00; B60H 3/00
[52] U.S. Cl. ........................................ 165/12; 165/22; 165/42; 165/43; 237/2 A; 237/5; 318/611; 236/78 C; 236/78 D
[58] Field of Search .................. 165/12, 16, 22, 43, 165/42, 28; 237/2 A, 5; 98/2, 2.01; 236/13, 78 C, 78 D; 318/611

[56] References Cited

U.S. PATENT DOCUMENTS

| | | | |
|---|---|---|---|
| 4,096,426 | 6/1978 | Tremaine et al. | 318/611 |
| 4,365,663 | 12/1982 | Inoue et al. | 165/12 |
| 4,381,074 | 4/1983 | Iijima et al. | 165/43 |
| 4,450,897 | 5/1984 | Iijima et al. | 165/43 |
| 4,456,166 | 6/1984 | Kagohata | 165/43 |
| 4,513,808 | 4/1985 | Ito et al. | 165/43 |
| 4,537,245 | 8/1985 | Nishimura et al. | 165/43 |
| 4,649,709 | 3/1987 | Kagohata et al. | 165/43 |
| 4,697,734 | 10/1987 | Ueda | 236/13 |

FOREIGN PATENT DOCUMENTS

| | | | |
|---|---|---|---|
| 0135316 | 7/1985 | Japan | 237/5 |
| 0219108 | 11/1985 | Japan | 237/5 |

Primary Examiner—John Ford
Attorney, Agent, or Firm—Bachman & LaPointe

[57] ABSTRACT

A system for controlling temperature of air to be discharged into a cabin of a vehicle in an automatically controlled air conditioner system of an automotive vehicle. The air conditioner system is provided with a cooling unit and a heating unit for cooling and heating conditioning air in the air conditioner system for delivery to the cabin of the vehicle. The air conditioner system includes a mechanism for mixing the cooling air and the heating air in a stepwise manner so as to generate a controlled temperature of conditioning air to be discharged into the vehicle cabin with a moderate adjustment in transition so as to maintain a desired vehicle cabin temperature.

4 Claims, 4 Drawing Sheets

AUTOMOTIVE AIR CONDITIONER SYSTEM WITH AUTOMATIC ADJUSTMENT OF DISCHARGE AIR TEMPERATURE

BACKGROUND OF THE INVENTION

1. Field of the Invention

The present invention relates generally to an automotive air conditioner system which can automatically control temperature of discharge air to be discharged into a vehicular cabin, the amount of the discharge air, mode of discharge of the discharge air into the vehicular cabin. More particularly, the invention relates to an automatic automotive air conditioner system which has improved transition characteristics in varying temperature of the discharge air.

2. Description of the Background Art

Various automotive air conditioner systems which automatically adjust discharge air temperature, have been proposed and put into the market. One of the typical automatic automotive air conditioner systems has been disclosed in the Japanese Patent First (unexamined) Publication (Tokkai) Showa 60-61319.

Such prior proposed automatic automotive air conditioner systems monitors environmental conditions affecting air discharge in the vehicular cabin. In the aforementioned Patent, there has been proposed an automatic control of a temperature of the discharge air to be discharged into the vehicular cabin according to environmental conditions represented by preselected control parameters, such as an ambient air, insolation, desired room temperature which may be set by an occupant of the vehicular cabin, and so forth.

In general, in such prior proposed automatic air conditioner systems, the temperature of the discharge air is derived on the basis of the preselected control parameters, such as ambient air temperature, insolation value, room temperature and desired room temperature. When the environmental condition is as different from the desired vehicular cabin condition, too cool or too hot discharge air tends to be discharged to cause discomfort on the passengers in the vehicular cabin. In addition, when environmental condition is suddenly changed, discharge air temperature to be discharged into the vehicular cabin suddenly changes to bring discomfort for the passenger. In one typical case, when insolation value suddenly increases, the insolation value representative control parameter changes suddenly to change the discharge air temperature to be derived based thereon. When sunbeam starts to irradiate on an insolation sensor, the discharge air temperature tends to be lowered suddenly and discharged toward the passenger. Such a sudden change makes the passenger surprised and results in an uncomfortable feeling as a result of the sudden change of the discharge air temperature which compensates the sudden change in heat value in the vehicular cabin due to the sunshine so as to maintain the desired temperature condition in the vehicular cabin.

SUMMARY OF THE INVENTION

Therefore, it is an object of the present invention to provide an automatic air conditioner system which can solve the aforementioned drawback in the prior proposed air conditioner systems.

Another object of the invention is to provide an automatic air conditioner system which allows moderate change of the conditioner air temperature in transition for maintaining comfort in the vehicular cabin.

In order to accomplish the aforementioned and other objects, an automotive air conditioner system, according to the present invention, takes a feature of stepwise adjustment of the discharge air temperature. In order to facilitate the stepwise adjustment of the discharge air temperature, a target discharge air temperature is determined on the basis of one more more preselected control parameters. The discharge air temperature is adjusted toward the target discharge air temperature in stepwise fashion by adjusting the air mix door angular position in stepwise fashion.

According to one aspect of the invention, an automotive air conditioner system comprises a conditioning air passage means for defining a passage, into which air is introduced and through which a conditioning air is discharged into a vehicular cabin, the passage having a discharge air outlet for discharging conditioning air into the vehicular cabin, a cooling air source provided in the passage for cooling the air flowing through the passage, a heating air source provided in the passage and downstream for heating the air flowing through the passage, the heating air source having an inlet to introduce air to be heated therethrough and outlet to discharge heated air, a door means, associated with the heating air source, for adjusting amount of the air to be introduced into the heating air source, means for manually setting a desired temperature of the vehicular cabin, means for monitoring preselected air conditioner control parameters including a temperature of an air discharged through the discharge air outlet, means for deriving a target discharge air temperature on the basis of preselected control parameters as monitored by the monitoring means, and means for deriving a control signal having a value representative of the position of the door means for the controlling amount of the air to be introduced into the heating air source, on the basis of a difference between the monitored discharge air temperature and the target discharge air temperature, the control signal deriving means adjusting the control signal value by a correction value at every given timing for adjusting the the amount of air to be introduced into the heating air source and whereby adjusting the discharge air temperature toward the target discharge air temperature.

In the preferred embodiment, the control signal deriving means derives the correction value as a function of the difference. For this, the control signal deriving means may be cyclically operative for deriving the control signal value so that the discharge air temperature is adjusted toward the target discharge air temperature in stepwise fashion. In the practical operation, the control signal deriving means derives a basic target discharge air temperature on the basis of a preselected first control parameter and modifies the basic target discharge air temperature on the basis of a second control parameter for deriving the target discharge air temperature. The first control parameter may be an ambient air temperature and the basic target discharge air temperature is derived as a function of the ambient air temperature.

The second control parameter consists of the target discharge air temperature, the desired room air temperature, a target room air temperature derived for maintaining the room temperature at the desired temperature on the basis of a heat value factor affecting the temperature in the vehicular cabin, which heat value factor is insolation value and/or an ambient air temperature.

In the preferred construction of the automotive air conditioner system according to the invention, the conditioning air passage means defines a first air mix chamber and a second air mix chamber and a first discharge air outlet directed to an upper section of the vehicular cabin for discharging conditioning air in the first air mix chamber to the upper section of the vehicular cabin and a second discharge air outlet directed to a lower section of the vehicular cabin for discharging the conditioning air in the second air mix chamber to the lower section of the vehicular cabin. The first and second air mix chambers are operable essentially independent of each other.

According to another aspect of the invention, a system is provided for controlling the temperature of air to be discharged into a vehicular cabin in an automatically controlled air conditioner system of an automotive vehicle, which air conditioner system has a cooling unit and a heater unit for cooling and heating conditioning air in the air conditioner system and means for mixing cooled air and heated air for generating a controlled temperature of conditioning air to to be discharged into the vehicular cabin, which comprises a first sensor for monitoring a first heat value factor influencing the temperature of the air in the air conditioner system, second means for monitoring a second heat value factor influencing the temperature of the air in the vehicular cabin, third means for allowing manual set of a desired temperature condition in the vehicular cabin, fourth means for monitoring actual room temperature condition in said vehicular cabin, fifth means for monitoring a temperature of the conditioning air to be discharged into the vehicular cabin for adjusting the temperature condition in the vehicular cabin to the manually set desired temperature condition, and sixth means for deriving a target discharge air temperature on the basis of outputs of the first, second, third and fourth means and deriving the ratio of the cooled air and heated air for adjusting temperature of the conditioning air to be discharged into the vehicular cabin, the sixth means being cyclically operative for adjusting the ratio of the cooled air and the heated air by a given magnitude toward a ratio corresponding to the target discharge air temperature.

In the construction set forth above, the sixth means derives the given magnitude to adjust the ratio of the cooled air and the heated air as a function of a difference between the target discharge air temperature and monitored temperature of the conditioning air discharged. In the practical operation for deriving the target discharge air temperature, the sixth means derives a target room temperature on the basis of outputs of the third and fourth means, derives a basic target discharge air temperature on the basis of the output of the first means, and derives the target discharge air temperature on the basis of outputs of the first, second, third and fourth means, the target room temperature and the basic target discharge air temperature. In this case, the sixth means may derive a correction value for the basic target discharge temperature on the basis of outputs of the first, second, third and fourth means, and the target room temperature. Therefore, the sixth means varies the ratio of cooled air and heated air in stepwise fashion at every given timing toward the target discharge air temperature.

BRIEF DESCRIPTION OF THE DRAWINGS

The present invention will be understood more fully from the detailed description given herebelow and from the accompanying drawings of the preferred embodiment of the invention, which, however, should not be taken to limit the invention but are for explanation and understanding only.

In the drawings.

DESCRIPTION OF THE PREFERRED EMBODIMENT

Figure 1:
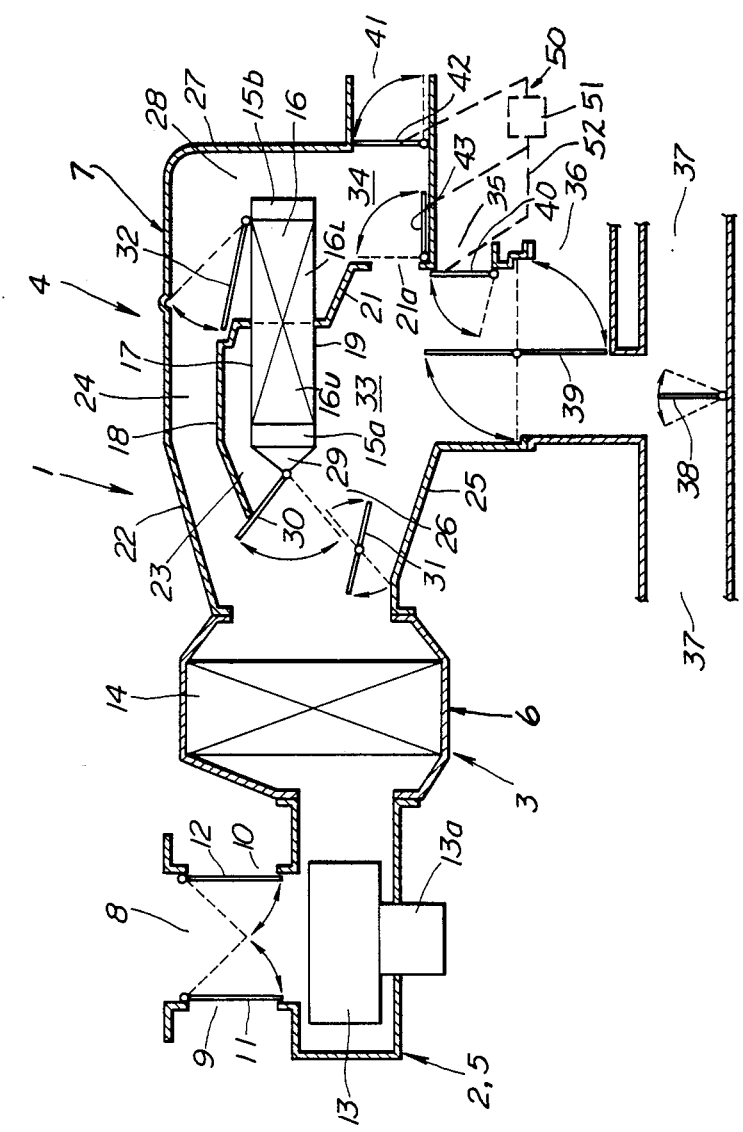
FIG. 1 is a longitudinal section showing mechanical construction of the preferred embodiment of an automotive air conditioner system according to the invention.
Figure 2:
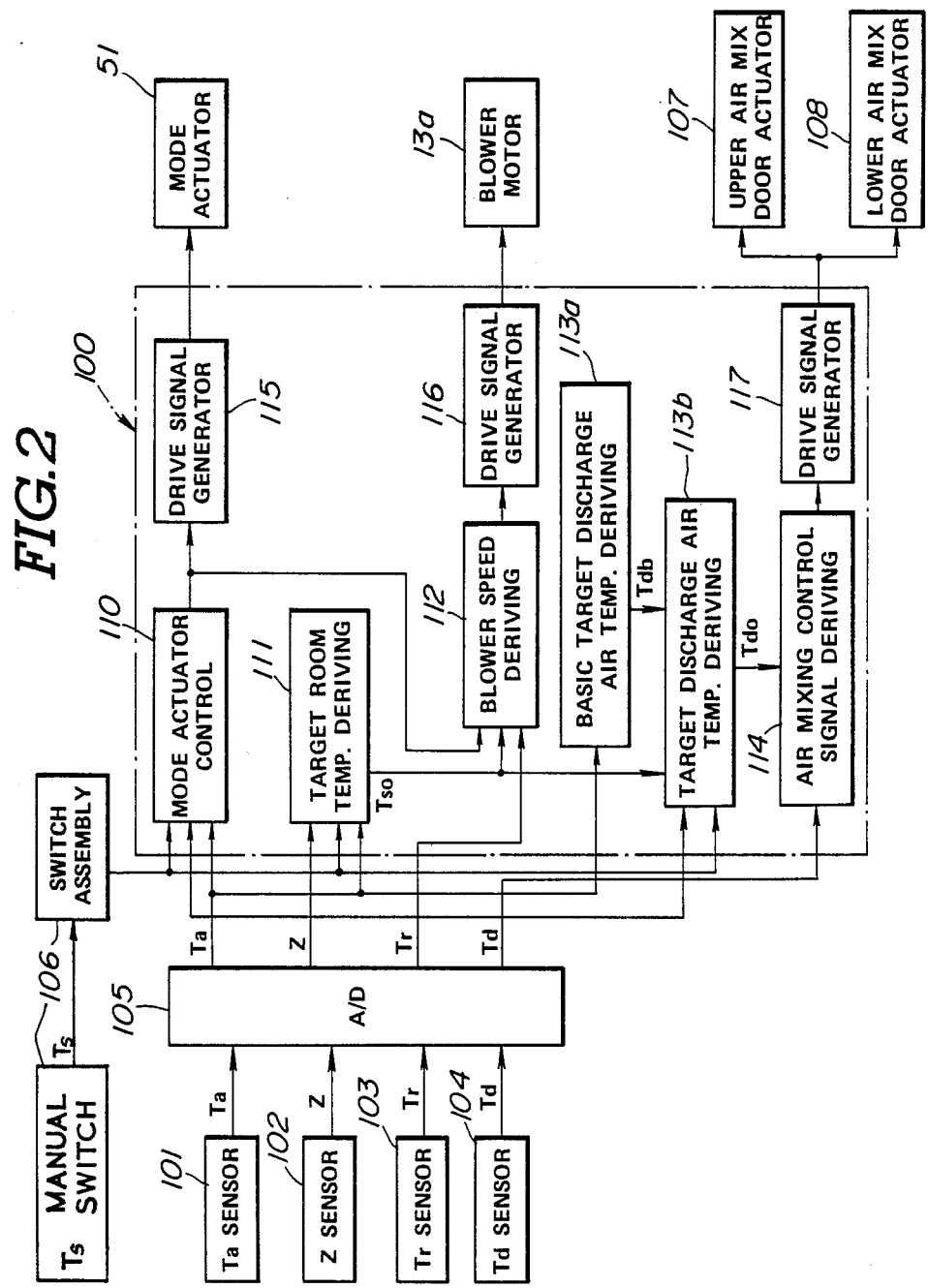
FIG. 2 is a block diagram of the preferred embodiment of a control circuit of the air conditioner system according to the invention.

Referring now to the drawings, particularly to FIGS. 1 and 2, the preferred embodiment of an automotive air conditioner system includes a conditioning air duct assembly 1. A duct body of the air duct assembly 1 is constituted of a blower housing 2, a cooler unit housing 3 and an air mixing unit housing 4. The blower housing 2 houses a blower unit 5. Similarly, a cooler unit 6 is housed within the cooler unit housing 3. A heater unit 7 is disposed within the air mixing unit housing 4.

The blower housing 2 defines air inlets 8, 9 and 10. The air inlet 8 is exposed to the outside of the vehicle body for introducing an atmospheric fresh air. The air inlet 8 will be thus referred to as "fresh air inlet". On the other hand, the air inlets 9 and 10 are exposed to the vehicular cabin to recirculate the air in the vehicular cabin. These air inlets 9 and 10 are thus hereafter referred to as "recirculation inlets". The fresh air inlet 8 and the recirculation inlets 9 and 10 are selectively opened and closed by means of a pair of air intake doors 11 and 12. The air intake doors are hinged on the wall of the blower housing to be operated between a fresh air mode position and a recirculation mode position. Namely, the air intake door 11 selectively closes the fresh air inlet 8 and the recirculation inlet 9. At the fresh air mode position, the air intake door 11 closes the recirculation inlet 9. On the other hand, at the recirculation mode position, the intake door 11 closes the fresh air inlet 8. Similarly, the intake door 12 closes the recirculation inlet 10 at its fresh air mode position and closes the fresh air inlet 8 at its recirculation mode position. The air intake doors 11 and 12 are synchronously operated between the fresh air mode position and the recirculation mode position. At the recirculation mode position, the intake doors 11 and 12 contact each other as shown by the broken line in FIG. 1. The intake doors 11 and 12 are also operative to a fresh/recirculation mixture position in which both of the fresh air inlets and one of or both of the recirculation inlets 9 and 10 are partially opened to introduce a mixture of the fresh air and the recirculation air. The blower housing 2 also defines a space for receiving a blower 13. The blower 13 is cooperatively associated with a blower motor 13a to be driven at a controlled blower speed.

The cooler unit housing 3 defines a space for receiving a cooling unit which comprises an evaporator 14. The evaporator 14 is cooperated with an engine driven compressor (not shown) for cooling air introduced through the fresh air inlet 8 and/or the recirculation inlets 9 and 10.

The heater unit 7 comprises a heater core 16 which has a heating medium introduction tank 15a and a heating medium outlet tank 15a. As a heating medium, an engine coolant is used as is well known. The heater core 16 has an air inlet 17 and an air outlet 19 and is so arranged as to place the air inlet and outlet substantially parallel to the air flow direction. This arrangement of the heater core 16 minimizes the interference of the heater core against the air flow and thus assist to optimize air flow, especially, when the air conditioner system is operated in full cool mode in a cooler (VENT) mode operation.

In the shown embodiment, the air mixing unit including the heater core 16 is so designed as to facilitate an independently controlled dual air flow type conditioner system, in which conditioning air discharged to the upper section of the vehicular cabin and the conditioning air to be discharge to the lower section of the vehicular cabin are controlled independently of each other. For this purpose, the heater core 16 is separated into two heating chambers $16_U$ and $16_L$. The air outlet of the heating chamber $16_U$ is communicated with an air mix chamber 33 which will hereafter be referred to an "upper air mix chamber". Likewise, the air outlet of the heating chamber $16_L$ is directed to an air mix chamber 34 which will hereafter be referred to as a "lower air mix chamber". Air flow guide 18 is disposed for separately introducing the air into the heating chambers $16_U$ and $16_L$. Also, an air flow guide 21 is provided for separating the air mix chambers 33 and 34. The air flow guide 21 is formed with a communication path 21a for communication between the upper and lower air mix chambers 33 and 34.

The air flow guide 18 defines an air induction path 23 for the upper heating chamber $16_U$ for introducing a controlled amount or proportion of conditioning air to the upper heating chamber $16_U$. Therefore, according to the amount or proportion of the air to be introduced into the upper heating chamber $16_U$, the heat value to be supplied to the upper air mix chamber 33 can be determined. On the other hand, an air induction path 24 is defined between the air flow guide 18 and the peripheral wall 22 of the air mixing unit housing. The air induction path 24 is communicated with the lower air mix chamber 34 via a cooling air path 28 defined between the side wall 27 and the heater core, and to the lower heating chamber $16_L$. Another air induction path 26 is defined between the heater core 16 and the peripheral wall 25 of the air mixing chamber 33 for introducing cooled air from the evaporator into the upper air mix chamber 33.

The input of the air induction path 26 is operably closed by means of an upper air mix door 30 and a butterfly door 31. The upper air mix door 30 is hinged on a door mount 29. The door mount 29 has tapered surfaces slanted toward the top at which the upper air mix door 30 is hinged. With this construction, flow resistance at the end of the heater core 16 can be minimized. The upper air mix door 30 is movable between a full cool position as shown by the solid line in FIG. 1, where the air induction path 23 is fully closed, and a full hot position as shown by the broken line in FIG. 1, where the upper air mix door cooperates with the butterfly door 31 to fully close the air induction path 26. Between the full cool position and full hot position, the upper air mix door 30 and the butterfly door 31 are operated to adjust the proportion of the hot air and cool air to be introduced into the upper air mix chamber 33. The upper air mix door 30 and the butterfly door 31 are operative symmetrically to each other. The butterfly door 31 is operated to the position shown by the solid line in FIG. 1 in full cool operation so as to minimize flow resistance against cooling air to be introduced into the upper air mix chamber 33 via the path 26. The butterfly door 31 is operated to the position as shown by the broken line when the upper air mix door 30 is placed in other than the full cool position. The butterfly door 31 in the position shown by the broken line interferes with air flow through the path 26 to cause turbulence in the upper air mix chamber for mixing the hot air from the upper heating chamber and the cool air through the path 26. On the other hand, a lower air mix door 32 is hinged to the heater core 16 for operably closing the inlet of the lower heating chamber $16_L$. In addition to the upper air mix door 30, the lower air mix door 32 is movable between the full cool position as shown by the solid line in FIG. 1 for full proportion of the air flowing through the path 24 into the lower air mix chamber 34 via the path 28, and a full hot position fully closing the inlet of the path 28 to introduce the full proportion of the air into the lower heating chamber $16_L$ as shown by the broken line in FIG. 1.

The upper air mix chamber 33 communicates with a defroster nozzle 35, a chest vent including a center vent 36 and a pair of side vents 37. On the other hand, the lower air mix chamber 34 communicates with a foot vent 41. The defroster nozzle 35 is operably closed by means of a defroster door 40. A butterfly door 39 is provided for operably closing the center vent 36 and the side vents 37. A swingable door 38 is provided at the junction of an air duct for the side vents for controlling conditioning air distribution between the side vents. On the other hand, a foot vent door 42 is provided for operably closing the foot vent 41. A separation door 43 is provided for operably closing the communication path 21a for blocking and establishing communication between the upper and lower air mix chambers 33 and 34.

The defroster door 40, the butterfly door 39, the foot vent door 42 and the separation door 43 are cooperated with an actuation mechanism which is generally represented by the reference numeral "50". The actuation mechanism 50 includes a mode actuator 51 for operation the doors at respective desired positions. In the shown embodiment, the defroster door 40, the butterfly door 39, the foot vent door 42 and the separation doors 43 are designed to be operated in synchronism with each other. For synchronous operation of the doors, a linkage system is provided in the actuation mechanism (not shown). Construction and operation of the actuation mechanism for synchronously operating the defroster door, the butterfly door, the foot vent door and the separation door has been disclosed in the co-pending U.S. patent application Ser. No. 096,712, filed Sept. 14, 1987 entitled "SYSTEM FOR AUTOMATICALLY CONTROLLING DISCHARGE OUTLET FOR CONDITIONING AIR IN AUTOMOTIVE AIR CONDITIONER SYSTEM" which application has been filed the same date to the present invention and commonly assigned to the assignee of the present invention. The disclosure of the above-identified co-pending U.S. patent application is herein incorporated by reference for the sake of disclosure.

FIG. 2 shows a control circuit for the preferred embodiment of the automotive air conditioner system according to the present invention, which control circuit facilitates automatic discharge control for adjusting discharge of conditioning air from the aforementioned chest vent, foot vent and defroster nozzle. The control circuit includes a microprocessor base control unit 100 which is illustrated in a discrete form showing function blocks performing necessary operations for controlling the air conditioner system. The control unit 100 is connected to an ambient temperature sensor 101 for monitoring an ambient air temperature Ta, which will hereafter be referred to as "Ta sensor", an insolation sensor 102 for monitoring magnitude of insolation Z, which sensor will be referred to as "Z sensor", a room temperature sensor 103 monitoring temperature Tr in a vehicular cabin, which sensor will hereafter be referred to as "Tr sensor", and a discharge air temperature sensor 104 for monitoring temperature Td of the conditioning air to be discharged, which sensor will hereafter be referred to as "Td sensor". The Ta sensor 101 produces a sensor signal indicative of ambient temperature Ta as monitored. The sensor signal output from the Ta sensor will be thus referred to as Ta sensor signal. The Z sensor 102 produces a sensor signal indicative of the insolation value Z, which sensor signal will be hereafter referred to as "Z sensor signal". The Tr sensor 103 outputs a sensor signal indicative of the room temperature Tr, which sensor signal will hereafter be referred to as "Tr sensor signal. Similarly, the Td sensor 104 outputs a sensor signal indicative of the detected discharge air temperature Td, which sensor signal will hereafter be referred to as "Td sensor signal". The Ta sensor 101, the Z sensor 102, the Tr sensor 103 and the Td sensor 104 are connected to the control unit 100 via an A/D converter 105. The control unit 100 is also connected to a manual operation switch assembly 106 which includes a switch unit for manually setting a desired room temperature Ts. The manual operation switch assembly 106 manually sets the desired room temperature Ts, and generates a signal indicative of the set room temperature. This signal indicative of the set room temperature will hereafter be referred to as "Ts signal".

Though it is not clearly shown on the drawings, the manual operation switch assembly 106 may include a plurality of switches including the desired room temperature setting switch unit. For example, the switch assembly may include a mode selector switch allowing manual selection of operation mode such as VENT, Bi-LEVEL, HEATER and DEF (defroster) modes, manual blower speed selection switch and so forth. The switch assembly further includes an AUTO mode selector switch for ordering full automatic operation of the air conditioner system, including automatic discharge control.

The control unit 100 is also connected to the aforementioned mode actuator 51 for operating the latter to adjust the open angles of the defroster door 40, the butterfly door 39, the foot vent door 42 and the separation door 43. The control unit 100 is further connected to the blower motor 13a and upper and lower air mix door actuators 107 and 108.

The control unit 100 has a mode actuator control stage 110, a target room temperature deriving stage 111 for deriving a target room temperature Tso, a blower speed deriving stage 112, a basic discharge air temperature derivation stage 113a, a discharge air temperature deriving stage 113b. The target room air temperature deriving stage receives the Ts signal and Ta sensor signal for deriving the target room temperature Tso based thereon. The mode actuator control stage 110 receives the Ts signal and the Ta signal for deriving the mode actuator control signal based thereon. The mode actuator control signal has a value representative of the angular position of the link plate 52 and thereby represents the open angles of the defroster door 40, the butterfly door 39, the foot vent door 42 and the separation door 43.

Figure 3:
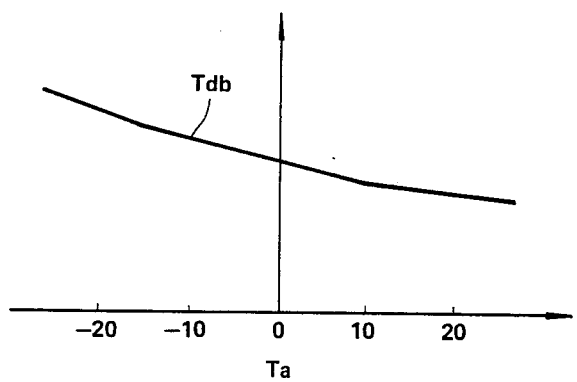
FIG. 3 is a chart showing variation of a basic target conditioning air temperature in relation to an ambient air temperature.

The target room temperature deriving stage 111 outputs a signal indicative of the derived target room temperature Tso, which signal will hereafter be referred to as "Tso signal". The Tso signal is fed to the target discharge air temperature deriving stage 113b and the blower speed deriving stage 112. On the other hand, the basis target discharge air temperature derivation stage 113a receives the Ta sensor signal to derive a basis target discharge air temperature Tdb. As shown in FIG. 3, the basic target discharge air temperature Tdb is pre-set to be derived in terms of the ambient air temperature Ta. In practice, the basic target discharge air temperature Tdb may be pre-set in a form of a table to be looked-up in terms of the ambient air temperature. The basic target discharge air temperature derivation stage 113a produces a signal indicative of the derived basic target discharge air temperature, which signal will hereafter be referred to as "Tdb signal". The Tdb signal is fed to the target discharge air temperature derivation stage 113b.

The target discharge air temperature deriving stage 113b receives the Z sensor signal and the Tr sensor signal in addition to the Tso signal and the Tdb signal for deriving the target discharge air temperature Tdo. The target discharge air temperature deriving stage 113b produces a signal indicative of the derived target discharge air temperature Tdo, which signal will hereafter be referred to as Tdo signal.

The practical operation to be performed in the target discharge air temperature Tdo will be discussed in detail later with reference to FIG. 4.

The Tdo signal is input to an air mixing control signal deriving stage 114. The air mixing control signal deriving stage 114 compares the Tdo signal value with the Td sensor signal value for deriving the air mixing control signal value on the basis of the difference of the Tdo signal value and the Td sensor signal value so that the difference may be reduced to zero.

On the other hand, the blower speed deriving stage 112 receives the Tr sensor signal, the mode actuator control signal and the Tr sensor signal for deriving blower speed based thereon. The blower speed deriving stage 112 thus produces a blower control signal indicative of the derived blower speed.

Figure 5:
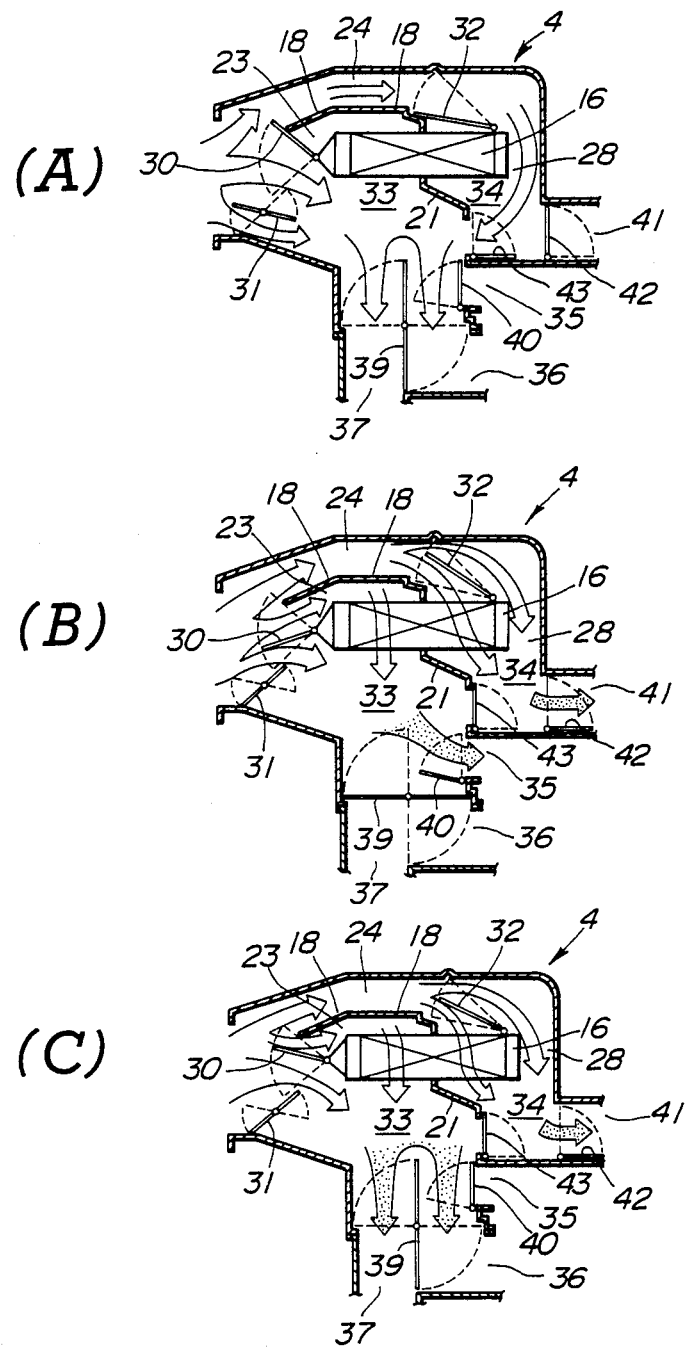
FIGS. 5(A) to 5(C) are sectional views of the air conditioner system at various operation modes.

The mode actuator control stage 110 is connected to a drive signal generator stage 115 which, in turn, feeds a mode actuator drive signal for driving a mode actuator in the actuation mechanism for driving the defroster door, the butterfly door, the foot vent door and the separation door synchronously to each other. As can be appreciated, the air conditioning system operates in VENT mode and HEATER mode and BI-LEVEL mode. FIGS. 5(A), 5(B) and 5(C) are door positions in typical modes. Namely, FIG. 5(A) shows VENT mode position, in which butterfly door 39 opens to allow the conditioning air to be discharged through chest vent. FIG. 5(B) shows HEATER mode position where the defroster door 40 and the foot vent door 42 are open.

FIG. 5(C) shows BI-LEVEL mode position wherein the butterfly door 39 and the foot vent door 42 are open. The transition control in switching the operation modes is disclosed in the aforementioned co-pending U.S. patent application. Therefore, the relevant disclosure concerning the transition control to understand the operation mode switching is again herein incorporated by reference.

Similarly, the air mixing control signal deriving stage 114 feeds the air mixing control signal to a drive signal generator stage 117. The drive signal generator stage 117 is responsive to the air mixing control signal to output an air mix door actuator drive signal to the upper and lower air mix door actuators 107 and 108. Also, the blower speed deriving stage 112 feeds a blower control signal indicative of the derived blower speed to a drive signal generator stage 116. The drive signal generator stage 116 is responsive to the blower speed control signal to output a blower drive signal to the blower motor 13a for driving the latter at the speed corresponding to the derived blower speed.

Figure 4:
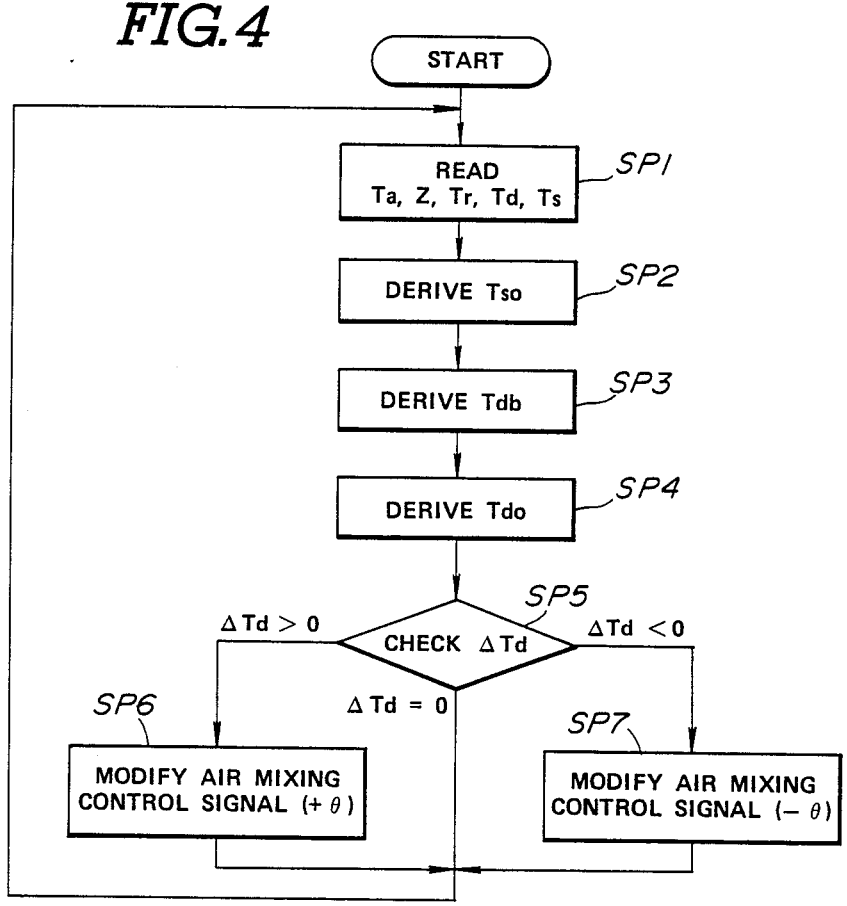
FIG. 4 is a flowchart of an air conditioner control program to control the air conditioner system for adjusting conditioning air temperature.

FIG. 4 shows a flowchart of a control program to be executed by the control unit 100. In the execution of the control program, control parameters, i.e. the ambient air temperature Ta, the insolation value Z, the room temperature Ta, the discharge air temperature Td and the set room temperature Ts are read out, at a step SP1. At a step SP2, the target room air temperature Tso is derived on the basis of the set room air temperature Ts and the room air temperature Tr. In practice, the target room air temperature is derived at a value necessary to maintain the room air temperature at the set room air temperature.

At a step SP3, the basic target discharge air temperature Tdb is derived in terms of the Ta sensor signal value. As set forth, derivation of the basic target discharge air temperature Tdb is performed by looking-up a table in which the basic target discharge air temperature Tdb is pre-set in terms of the Ta value, as a function (=f(Ta)). Then, at a step SP4, the target discharge air temperature Tdo is derived on the basis of the target room air temperature Tso, the basic discharge air temperature Tdb, the set room air temperature Ts and the insolation value Z. In practice, the target discharge air temperature Tdo is derived by calculation performed utilizing the following equation:

$$Tdo = Tdb - Kz.Z + Kr(Tso - Tr) + Ks(Ts - 25)$$

Where Kz, Kr and Ks are constants and set at the following values, for example.
Kz; 5/660° C. m²h/Kcal
Kr; 2
Ks; 2.

After the step SP4, the derived Tdo value is compared with Td sensor signal value at a step SP5 for deriving the difference ΔTd (=Tdo−Td). As will be appreciated, when the target discharge air temperature Tdo is higher than the discharge air temperature Td, the value ΔTd becomes positive. On the other hand, when the target discharge air temperature Tdo is lower than the discharge air temperature Td, the value ΔTd becomes negative. Therefore, by checking the sign of the ΔTd value, required control can be distinguished between heating side adjustment (+ΔTd) and cooling side adjustment (−ΔTd). At the step SP5, therefore, a check is performed about the sign of the ΔTd value.

If the ΔTd is zero which means that the discharge temperature Td matches the target discharge air temperature Tdo, as checked at the step SP5, the process returns to the step SP1. Therefore, the air mixing control signal value is held unchanged to maintain the upper and lower air mix doors 30 and 32 in place.

On the other hand, when the ΔTd value is positive, process goes to a step SP6 to derive the air mixing control signal value. In this case, the control signal value is to be increased to increase the proportion or amount of the air to be introduced into the heater core. In order to facilitate moderate adjustment in transition, the control signal value is derived at a value K.ΔTd, where K is pre-set value and smaller than 1. At the step SP6, the air mixing control signal having the increased value is output to the air mix door actuators 61 and 62 to increase the upper and lower air mix door open angles 0.

On the other hand, when the ΔTd value is negative, the process goes to a step SP7, in which the air mixing control signal value is decreased by K.ΔTd for reducing proportion or amount of the air to be introduced into the heater core.

As will be appreciated, since the variation of the discharge air temperature in one cycle of program execution is limited so as not to cause noticable change of the temperature of the discharge air, an uncomfortable feeling will never be given to the passenger in the vehicular cabin.

In practice, the value K may be experimentally determined so that the transition period in changing the discharge air temperature can be held reasonably short and so that noticable change of the discharge air temperature should not occur. Though the same constant K is used for deriving the air mix door angle change magnitude in cooling side adjustment and heating side adjustment, it should be appreciated that it may be possible to use different constants for adjustment of the air mix door open angles for increasing and decreasing the open angles.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An automotive air conditioning system for controlling the air temperature of a vehicle cabin comprising:
   (a) passage means for conditioning air, said passage means having inlet means for receiving air to be conditioned in said passage means and outlet means for delivering conditioned air to said vehicle cabin;
   (b) cooling means provided in said passage means between said inlet means and said outlet means for selectively cooling said air received from said inlet means;
   (c) heating means provided in said passage means downstream of said cooling means for selectively heating said air received from said inlet means, said heating means having an inlet to introduce said air to be heated thereto and an outlet to discharge heated air therefrom;

(d) flow control means for selectively controlling the amount of air introduced to said heating means through said inlet;

(e) temperature control means for selecting a desired vehicle cabin temperature (Ts);

(f) first means for continually monitoring ambient temperature (Ta), insolation (Z), vehicle cabin temperature (Tr), discharge air temperature to cabin vehicle (Td) and desired vehicle cabin temperature (Ts) so as to derive a target discharge air temperature (Tdo) for the conditioned air delivered to said vehicle cabin so as to obtain the desired cabin temperature (Ts); and (g) second means for continually comparing said discharge air temperature (Td) with said target discharge air temperature (Tdo) and operating said flow control means in response to the difference ($\Delta Td$) between said discharge air temperature (Td) and said target discharge air temperature (Tdo) so as to control the amount of air introduced to said heating means by adjusting said discharge air temperature (Td) to said target discharge air temperature (Tdo) in a stepwise manner as a function of $K\Delta Td$ where K is a value less than unity so as to obtain the desired cabin temperature (Ts) during transition.

2. A system for controlling the temperature of an air to be discharged into a vehicular cabin in an automatically controlled air conditioner system of an automotive vehicle, said air conditioner system having a cooling unit and a heating unit for cooling and heating conditioning air in the air conditioner system and means for mixing the cooled air and the heated air so as to generate a controlled temperature of conditioning air to be discharged into said vehicular cabin, comprising:

first means for monitoring ambient air temperature (Ta);

second means for monitoring insolation (Z);

third means for allowing manual set of a desired temperature condition (Ts) in said vehicular cabin;

fourth means for monitoring actual room temperature condition (Tr) in said vehicular cabin;

fifth means for monitoring the temperature (Td) of said conditioning air to be discharged into said vehicular cabin for adjusting the temperature condition (Tr) in said vehicular cabin to said manually set desired temperature condition (Ts); and sixth means for deriving a target discharge air temperature (Tdo) on the basis of outputs of said first, second, third, fourth and fifth means and controlling the ratio of said cooled air and heated air for adjusting temperature (Td) of said conditioning air to be discharged into said vehicular cabin, said sixth means being cyclically operative for adjusting said ratio of said cooled air and said heated air by a given magnitude toward a ratio corresponding to said target discharge air temperature (Tdo) in a stepwise manner as a function of $K\Delta Td$, where $\Delta Td$ is the difference between the discharge air temperature (Td) and the target discharge air temperature (Tdo), and where K is a value less than unity so as to obtain the desired cabin temperature (Ts) during transition.

3. A system as set forth in claim 2, wherein said sixth means derives a target room temperature (Tso) on the basis of outputs of said first and third means, derives a basic target discharge air temperature (Tdb) on the basis of the output of said first means, and derives said target discharge air temperature (Tdo) on the basis of outputs of said first, second, third and fourth means, said target room temperature (Tso) and said basic target discharge air temperature (Tdb).

4. A system as set forth in claim 3, wherein said sixth means derives a correction value for said basic target discharge temperature (Tdo) on the basis of outputs of said first, second, third and fourth means, said target room temperature (Tso).

* * * * *